(12) United States Patent
He

(10) Patent No.: US 8,724,631 B2
(45) Date of Patent: May 13, 2014

(54) METHOD, SYSTEM AND APPARATUS FOR TRANSMITTING DATA

(75) Inventor: Hui He, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 181 days.

(21) Appl. No.: 13/497,126

(22) PCT Filed: Jun. 18, 2010

(86) PCT No.: PCT/CN2010/074072
§ 371 (c)(1),
(2), (4) Date: Mar. 20, 2012

(87) PCT Pub. No.: WO2011/035615
PCT Pub. Date: Mar. 31, 2011

(65) Prior Publication Data
US 2012/0177053 A1    Jul. 12, 2012

(30) Foreign Application Priority Data

Sep. 23, 2009 (CN) .......................... 2009 1 0178106

(51) Int. Cl.
*H04L 12/28* (2006.01)

(52) U.S. Cl.
USPC ........................................................ 370/392

(58) Field of Classification Search
None
See application file for complete search history.

(56) References Cited

U.S. PATENT DOCUMENTS

| 7,797,411 B1 * | 9/2010 | Guruswamy et al. ......... 709/223 |
| 2003/0174706 A1 * | 9/2003 | Shankar et al. ............... 370/393 |

(Continued)

FOREIGN PATENT DOCUMENTS

| CN | 1801764 A | 7/2006 |
| CN | 101350755 A | 1/2009 |

(Continued)

OTHER PUBLICATIONS

Dong Ping Research on the Scalable Routing Architecture Based on Separating and Mapping of Identity and Locator, Beijing Jiaotong University Doctoral Dissertation, 2008.

(Continued)

*Primary Examiner* — Anh-Vu Ly
*Assistant Examiner* — Gustavo Lopez-Vargas
(74) *Attorney, Agent, or Firm* — Ling Wu; Stephen Yang; Ling and Yang Intellectual Property

(57) ABSTRACT

The present invention discloses a method, a system and an apparatus for transmitting data, which are applied in an identification identifier locater separation network, the method includes: a source terminal sending a first data packet to a source Access Support Node (ASN), and taking an Access Identity (AID) of the source terminal and the AID of a destination terminal as a source address and a destination address of the first data packet respectively; the source ASN, after receiving the first data packet, if a Routing Identifier (RID) corresponding to the AID of the destination terminal is not queried out locally, encapsulating the first data packet which is as a payload data packet to a second data packet by using Generic Routing Encapsulation (GRE) format, and adding a GRE packet header and a delivery protocol packet header; and the source ASN sending the second data packet to a mapping forwarding plane, which queries the RID corresponding to the AID of the destination terminal and sends the first data packet to the destination ASN according to the queried RID. The present invention realizes a high data forwarding performance, and a network processor may be used to process, the encapsulation format is easy to extend, and the edition is convenient to upgrade.

10 Claims, 2 Drawing Sheets

(56) References Cited

U.S. PATENT DOCUMENTS

| | | | |
|---|---|---|---|
| 2005/0053054 A1* | 3/2005 | Das et al. | 370/352 |
| 2007/0237147 A1* | 10/2007 | Quinn et al. | 370/392 |
| 2008/0080508 A1* | 4/2008 | Das et al. | 370/392 |
| 2008/0259924 A1* | 10/2008 | Gooch et al. | 370/392 |
| 2009/0110003 A1* | 4/2009 | Julien et al. | 370/476 |
| 2009/0161547 A1* | 6/2009 | Riddle et al. | 370/236 |
| 2010/0157894 A1* | 6/2010 | Park et al. | 370/328 |
| 2010/0220627 A1* | 9/2010 | Moussa et al. | 370/252 |
| 2010/0290485 A1* | 11/2010 | Martini et al. | 370/477 |
| 2010/0290621 A1* | 11/2010 | Muhanna et al. | 380/270 |
| 2012/0008505 A1* | 1/2012 | LaVigne et al. | 370/241 |
| 2012/0057502 A1* | 3/2012 | O'Neill | 370/254 |

FOREIGN PATENT DOCUMENTS

| | | |
|---|---|---|
| JP | 2008244925 A | 10/2008 |
| WO | 2008110359 A1 | 9/2008 |

OTHER PUBLICATIONS

International Search Report for PCT/CN2010/074072 dated Sep. 16, 2010.

"Route Optimization in Mobile IP" draft-ietf-mobileip-optim-11.txt; Charles Perking Nokia Research Center, David B. Johnson Carnegie Mellon University; Mobile IP Working Group Internet Draft, Sep. 6, 2001.

* cited by examiner

METHOD, SYSTEM AND APPARATUS FOR TRANSMITTING DATA

TECHNICAL FIELD

The present invention relates to the internet technology field, and particularly to a method, a system and an apparatus for transmitting data.

BACKGROUND OF THE RELATED ART

At present, the IP address in the transmission control protocol/internet protocol (TCP/IP) widely applied in internet has dual functions, that is, serves both as a locator of a host network interface of a communication terminal of the network layer in a network topology, and as an identification identifier of a host network interface of the transport layer. A case of host movement is not taken into account at the beginning of design of TCP/IP. However, the defect of semantics overload of IP address has become increasingly evident with the daily widespread of the hose movement. When the IP address of a host changes, not only the routing will change, but also the identification identifier of the communication terminal host will change, which thus cause more and more routing load, meanwhile the change of host identifier will cause an interruption of application and connection.

The purpose of proposing the separation of the identification identifier and the locator is to solve problems such as semantics overload of IP address and heavy routing load and security, and separate the double functions of IP address, thereby realizing supporting the functions of mobility, multi-home, IP address dynamic redistribution, reducing routing load and exchange visit between different network areas in the next generation of internet, and so on.

In an identification identifier locator separation network, for an initial data packet of user data, because the Access Support Node (ASN) has not yet obtained the mapping information of identification identifier and locator of the destination terminal, therefore the locator of the destination terminal can not be queried locally, and a direct forwarding can not be implemented. There exist two main ideas for solving this problem, one of which is to cache the data packet for which the mapping information can not be queried out locally in the ASN, and not forward it until the mapping information is obtained; the other one is to deliver the data packet for which the mapping information can not be queried out locally to the mapping forwarding plane for forwarding, which is only a conceived thought now and has no specific implementations yet.

SUMMARY OF THE INVENTION

The technical problem the present invention solves is to provide a method, system and apparatus for transmitting data, to solve the problem that a first data packet can not be forwarded because an ASN can not query the locator of a destination terminal of the first data packet locally, and realize the forwarding of the first data packet of user data.

In order to solve the above technical problem, a method for transmitting data according to the present invention, which is applied in an identification identifier locater separation network, comprises:

a source terminal sending a first data packet to a source Access Support Node (ASN), and taking an Access Identity (AID) of the source terminal and the AID of a destination terminal as a source address and a destination address of the first data packet respectively;

the source ASN, after receiving the first data packet, if a Routing Identifier (RID) corresponding to the AID of the destination terminal is not queried out locally, encapsulating the first data packet which is as a payload data packet to a second data packet by using Generic Routing Encapsulation (GRE) format, and adding a GRE packet header and a delivery protocol packet header; and the source ASN sending the second data packet to a mapping forwarding plane, which queries the RID corresponding to the AID of the destination terminal and sends the first data packet to the destination ASN according to the queried RID.

The step of the source ASN sending the second data packet to a mapping forwarding plane comprises: the source ASN taking the RIDs of the source ASN and an access identity location register (ILR) as a source address and a destination address of a delivery protocol packet header respectively of the second data packet, and sending the second data packet to the access ILR of the mapping forwarding plane.

The step of the mapping forwarding plane querying the RID corresponding to the AID of the destination terminal comprises: the access ILR decapsulating the received second data packet, and queries a responsible ILR which stores the mapping information of the AID of the destination terminal according to the AID of the destination terminal;

the access ILR encapsulating a query data packet using GRE format, and sends the query data packet to the responsible ILR, wherein the RIDs of the access ILR and the responsible ILR are as the source address and the destination address of the delivery protocol packet header of the query data packet respectively, and the first data packet is carried; and the responsible ILR decapsualting the received query data packet, and querying the RID corresponding to the AID of the destination terminal.

The step of the mapping forwarding plane sending the first data packet to the destination ASN according to the queried RID comprises:

the responsible ILR, after querying the corresponding RID according to the AID of the destination terminal, encapsulating a third data packet using GRE format, wherein the RIDs of the responsible ILR and the destination ASN are used as the source address and the destination address respectively in the delivery protocol packet header of the third data packet, and the first data packet is carried, and sending the third data packet to the destination ASN.

The above method further comprising: the responsible ILR, after querying the corresponding RID according to the AID of the destination terminal, encapsulating an answer data packet using GRE format by encapsulating the queried mapping information of the AID of the destination terminal and the RID to a payload data packet, and taking the RIDs of the responsible ILR and the source ASN as the source address and the destination address of the delivery protocol packet header respectively, and sending the answer data packet to the source ASN; and the source ASN decapsulating the received answer data packet, and storing the mapping information of the AID of the destination terminal and the RID. The above method further comprising:

the destination ASN, after receiving the third data packet, decapsulating out the first data packet and sending the first data packet to the destination terminal by an access network.

The above method further comprising: the source ASN, after receiving the first data packet, if the RID corresponding to the AID of the destination terminal is queried out locally, encapsulating a fourth data packet using GRE encapsulation by taking the first data packet as a payload data packet, adding a GRE packet header and a delivery protocol packet header and taking the RIDs of the source ASN and the destination ASN as the source address and the destination address of the delivery protocol packet header, and sending the fourth data packet to the destination ASN.

The present invention also provides a system for transmitting data, applied in an identification identifier locator separation network, the system comprising: a source terminal, a source Access Support Node (ASN), a mapping forwarding plane and a destination ASN, wherein:

the source terminal is configured to: send a first data packet to a source Access Support Node (ASN), and take an Access Identity (AID) of the source terminal and the AID of a destination terminal as a source address and a destination address of the first data packet respectively the source ASN is configured to: after receiving the first data packet, if a Routing Identifier (RID) corresponding to the AID of the destination terminal is not queried out locally, encapsulate the first data packet which is as a payload data packet to a second data packet by using Generic Routing Encapsulation (GRE) format, and adding a GRE packet header and a delivery protocol packet header; and sending the second data packet to a mapping forwarding plane;

the mapping forwarding plane is configured to: query the RID corresponding to the AID of the destination terminal, and send the first data packet to the destination ASN according to the queried RID.

The mapping forwarding plane comprises an access Identity Location Register (ILR); the source ASN is configured to send the second data packet to the mapping forwarding plane by the following way of: taking the RIDs of the source ASN and an access identity location register (ILR) as a source address and a destination address of a delivery protocol packet header respectively of the second data packet, and sending the second data packet to the access ILR. The mapping forwarding plane further comprises a responsible ILR;

the access ILR is configured to: decapsulate the received second data packet, and query a responsible ILR which stores the mapping information of the AID of the destination terminal according to the AID of the destination terminal; encapsulate a query data packet using GRE format, and sends the query data packet to the responsible ILR, wherein the RIDs of the access ILR and the responsible ILR are as the source address and the destination address of the delivery protocol packet header of the query data packet respectively, and the first data packet is carried;

the responsible ILR is configured to: decapsulate the received query data packet, and query the RID corresponding to the AID of the destination terminal.

The responsible ILR is also configured to: after querying the corresponding RID according to the AID of the destination terminal, encapsulate a third data packet using GRE format, wherein the RIDs of the responsible ILR and the destination ASN are used as the source address and the destination address respectively in the delivery protocol packet header of the third data packet, and the first data packet is carried, and send the third data packet to the destination ASN.

The responsible ILR is also configured to: after querying the corresponding RID according to the AID of the destination terminal, encapsulate an answer data packet using GRE format by encapsulating the queried mapping information of the AID of the destination terminal and the RID to a payload data packet, and taking the RIDs of the responsible ILR and the source ASN as the source address and the destination address of the delivery protocol packet header respectively, and send the answer data packet to the source ASN;

the source ASN is also configured to: decapsulate the received answer data packet, and storing the mapping information of the AID of the destination terminal and the RID.

The destination ASN is configured to: after receiving the third data packet, decapsulate out the first data packet, and send the first data packet to the destination terminal by an access network.

The source ASN is also configured to: after receiving the first data packet, if the RID corresponding to the AID of the destination terminal is queried out locally, encapsulate a fourth data packet using GRE encapsulation by taking the first data packet as a payload data packet, adding a GRE packet header and a delivery protocol packet header and taking the RIDs of the source ASN and the destination ASN as the source address and the destination address of the delivery protocol packet header, and send the fourth data packet to the destination ASN.

The present invention also provides a source Access Support Node (ASN), located in an identification identifier locater separation network, wherein, the source ASN is configured to: after receiving a first data packet, in which a Access Identifier (AID) of the source terminal and the AID of a destination terminal are taken as a source address and a destination address of the first data packet, sent by a source terminal, if a Routing Identifier (RID) corresponding to the AID of the destination terminal is locally queried out, then encapsulate the first data packet which is as a payload data packet to a second data packet by using Generic Routing Encapsulation (GRE) format and adding a GRE packet header and a delivery protocol packet header; and send the second data packet to a mapping forwarding plane, by which the first data packet is sent to the destination ASN.

To sum up, according to the present invention, data of a terminal is re-encapsulated using a GRE (Generic Routing Encapsulation) format, wherein, the GRE is widely supported in the existing IP network due to its generic encapsulation format, therefore by using the GRE format, modifications of present network devices may be reduced, the encapsulated data packet may be routed in the IP backbone network normally, and routers in the backbone network need no modification; the GRE has not limit on encapsulations of inner layer and outer layer, so the coding protocol of various user identifiers and locators may be supported flexibly; the GRE protocol regulates a variety of extension, and the problems such as security, checking and order preserving may be solved better by supporting protocol extension; also, the present invention realizes a high data forwarding performance, a network processor may be used to process, the encapsulation format is easy to extend, and the edition is convenient to upgrade.

PREFERRED EMBODIMENTS OF THE PRESENT INVENTION

Figure 1:
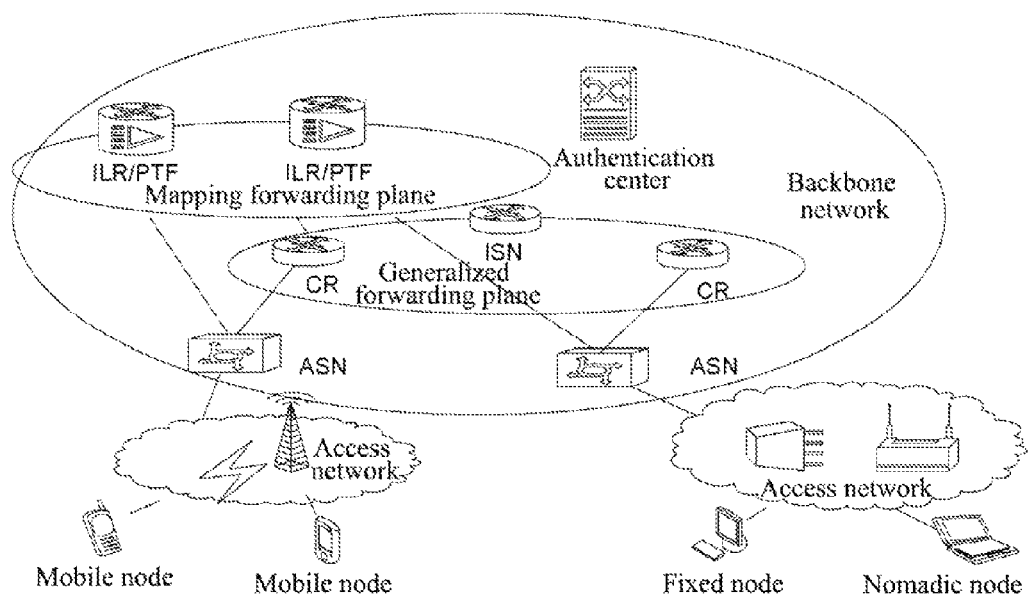
FIG. 1 is an architecture diagram of an identification identifier locater separation network.

FIG. 1 shows a architecture diagram of an identification identifier locater separation network, and the network in the architecture is divided into an access network and a backbone network. The access network is located at the edge of the backbone network, and is configured to be responsible for access of all terminals. The backbone network is responsible for routing and forwarding of data messages between terminals which access by the access network. There is no overlap between the access network and the backbone network in the topology relation.

The network of this architecture has two types of identifiers: Access Identifier (AID) and Routing Identifier (RID). Wherein the AID is user identification identifier of a terminal, configured to identify the identification of a terminal user (also called as a user for short), the network assigns a unique AID for each terminal user, which is used in the access network and remains unchanged during movement of the terminal; the RID is a locator assigned for the terminal, which is used in the backbone network.

In this architecture, the terminal of the access network may be one or more of: a mobile terminal, a fixed terminal and a nomadic terminal, such as a cell phone, a fixed phone, a computer and an application server, and so on.

In this architecture, the access network provides a two-layer (the physical layer and the link layer) access means to the terminal and maintains a physical access link between the terminal and ASN. Probable two-layer access means includes: cellular mobile network technology (GSM/CDMA/TD-SCDMA/WCDMA/WiMAX/LTE), DSL, broadband fiber access or WiFi access, and so on.

The backbone network of this architecture may be divided into two planes in networking: a generalized forwarding plane and a mapping forwarding plane, and an Access Service Node (ASN) and an authentication center are included.

The ASN is a boundary node of the generalized forwarding plane, mapping forwarding plane and the access network, with interfaces to the access network, the generalized forwarding plane and the mapping forwarding plane. The ASN is configured to provide access service to the terminal, maintain connection between the terminal and the network, assign RID for the terminal, register and query the RID of the terminal at the mapping forwarding plane, maintain AID-RID mapping information, and realize routing and forwarding of the data message.

The generalized forwarding plane is mainly configured to route and forward the data message with a RID as a destination address according to the RID in the data message, and the data routing action in the generalized forwarding plane is in accordance with a traditional IP network. As shown in the figure, the main network elements of the generalized forwarding plane include a Common Router (CR) and an Interconnect Service Node (ISN).

The mapping forwarding plane is mainly configured to store the identification location mapping information (i.e. mapping information of the AID-RID) of the terminal, process the registration and query for the location of the terminal, route and forward the data message with a RID as a destination address. As shown in the figure, the main network elements of the mapping forwarding plane include an Identity Location Register/Packet Transfer Function (ILR/PTF).

The authentication center, is configured to record attribute information, such as user category, certification information and user service lever, and so on, of the network terminal user of this architecture, to complete the access authentication and authorization of the terminal, and may also has a function of charging. The authentication center supports a mutual authentication between the terminal and the network, which may generate user security information used for authentication, integrity protection and encryption.

Figure 2:
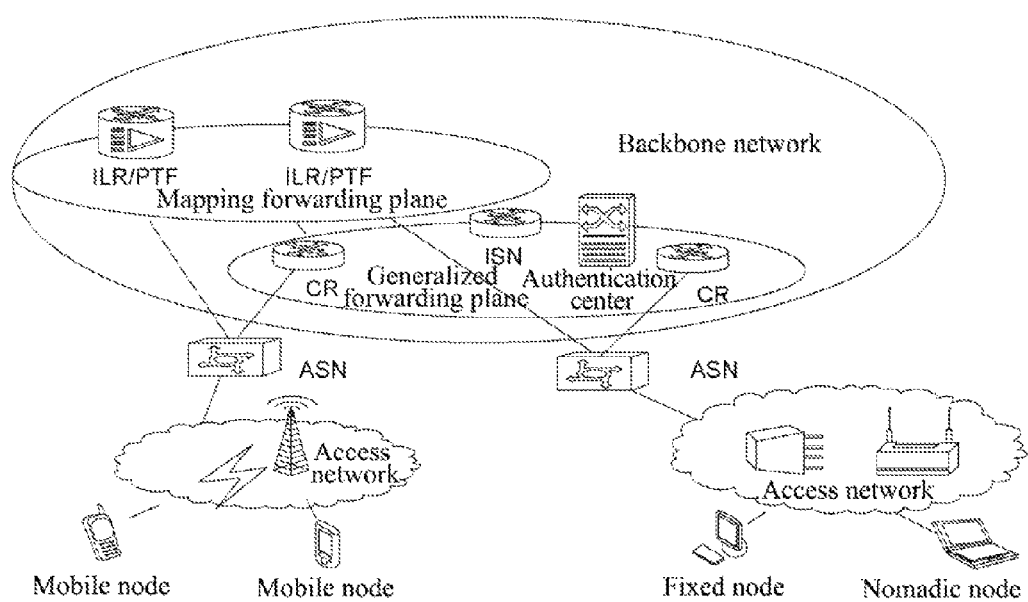
FIG. 2 is an architecture diagram of another identification identifier locater separation network.

In another architecture, the ASN is independent from the backbone network in the division of the architecture and is located at the boundary node of the backbone network and the access network, with interfaces to the access network and the backbone, as shown in FIG. 2. The practical function is the same as in FIG. 1.

According to this example, the source ASN encapsulates the first data packet sent by the source terminal to the second data packet using the GRE format, and sends the second data packet to the mapping forwarding plane, which executes operations such as RID query, data packet forwarding, and so on. The GRE is a generic encapsulation protocol, the message format of which is as follows:

| Delivery Header |
| GRE Header |
| Payload packet |

In the GRE format, the data packet to be routed and encapsulated is taken as a payload packet, which is encapsulated using GRE format, that is, adding a GRE packet header, to be a GRE data packet (an inner data packet), which is carried and forwarded by another outer layer protocol, that is, adding a packet header of an outer protocol, wherein the outer layer protocol used to load the GRE data packet is called as delivery protocol.

In an identification identifier locater separation network architecture, the data packet with an identification identifier as the address is taken as a payload data packet, the locator is taken as the address in the packet header of the delivery protocol, the encapsulation format of which is as follows:

| IP Header (protocol = 47) with RID as address |
| GRE Header (protocol type = 0x800) |
| IP Header with AID as address |
| User data: DATA |

The specific embodiments of the present invention will be described below in combination with drawings.

Figure 3:
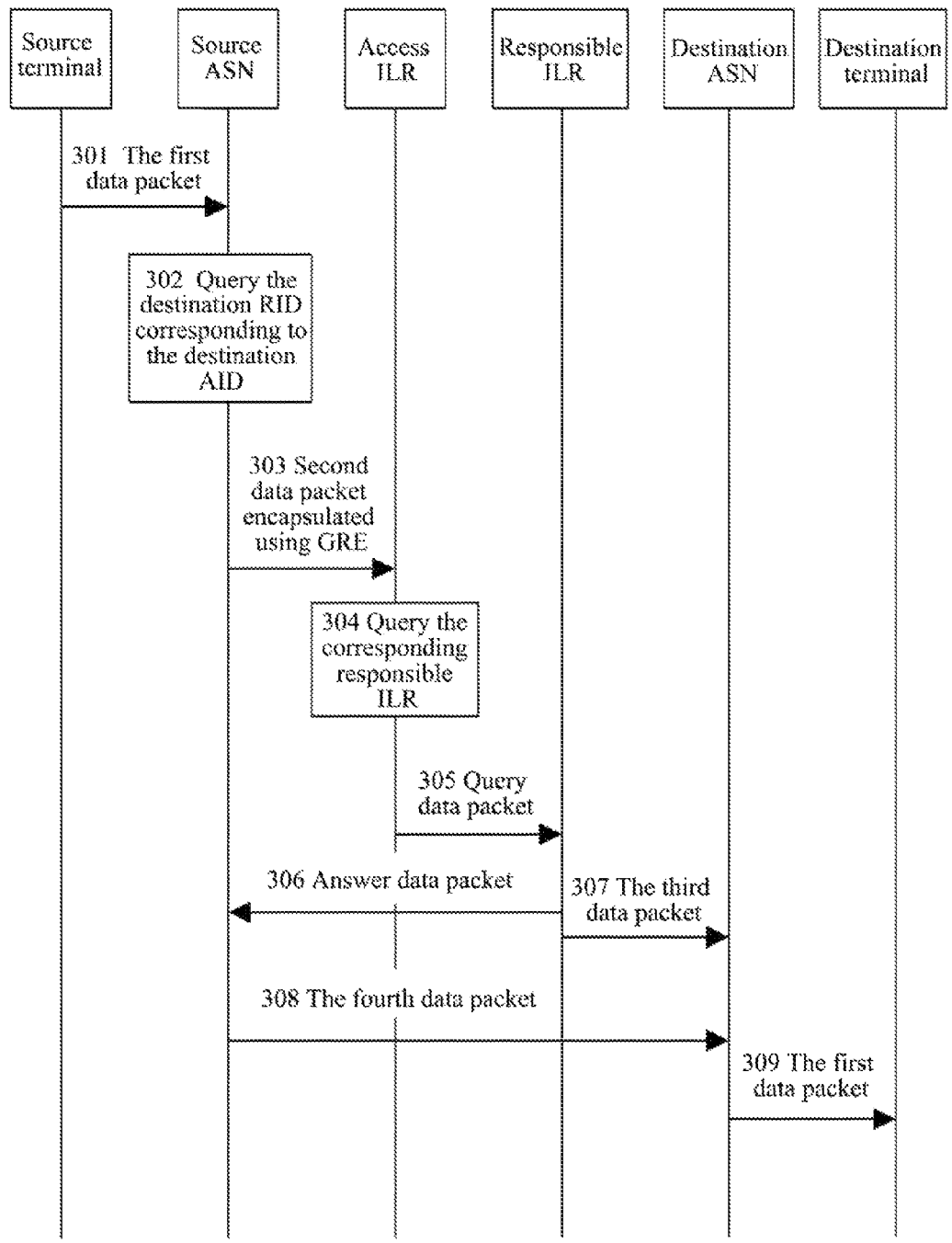
FIG. 3 is a flowchart of method for transmitting data according to the present invention.

FIG. 3 is a flowchart of a method for transmitting data according to the embodiment, comprising the following steps.

In step 301, a source terminal sends the first data packet to a source ASN by an access network, wherein, the source address of the first data packet is AID of the source terminal (source AID), the destination address is the AID of the destination terminal (destination AID).

The format of the data packet is standardized Ipv4 or Ipv6 data packet format.

In step 302, the source ASN, after receiving the first data packet sent by the source terminal, queries the destination RID corresponding to the destination AID according to the destination AID from the local AID-RID mapping information, if it is queried out, step 308 is executed; if it is not queried out, step 303 is executed.

In step 303, the source ASN encapsulates the received first data packet to the second data packet by performing GRE encapsulation, wherein, the first data packet is taken as a payload data packet, a GRE header and a delivery protocol packet header are added, and the RIDs of the source ASN and the access ILR are taken as the source address and the destination address of the delivery protocol packet header of the second data packet, and the source ASN sends the second data packet to the access ILR of the mapping forwarding plane.

In step 304, the access ILR decapsulates the received second data packet, and queries the responsible ILR storing the mapping information of the destination AID according to the destination AID in the first data packet obtained by the decapsulation.

A query table may be stored in the access ILR, and the corresponding relationship between the AID and the responsible ILR may be recorded in the query table.

In step 305, the access ILR sends a query data packet to the queried responsible ILR, wherein, the query data packet is encapsulated using GRE, the source address and the destination address of the delivery protocol packet header are the routing identifiers of the access ILR and the responsible ILR, and the first data packet is carried.

In step 306, the responsible ILR decapsulates the received query data packet, and queries the corresponding destination RID according to the destination AID, and encapsulates the queried mapping information of the destination RID and the destination AID to the payload data packet, takes the RIDs of the responsible ILR and the source ASN as the source address and the destination address of the delivery protocol packet header, encapsulates an answer data packet d using GRE format, and sends the answer data packet to the source ASN.

The source ASN, after receiving the answer data packet, stores the mapping information of the destination AID and the destination RID.

In step 307, the responsible ILR takes the first data packet as the payload data packet of the third data packet, and takes the RIDs of the responsible ILR and the destination ASN as the source address and the destination address respectively of the delivery protocol packet header of the third data packet, which is encapsulated using GRE, and sends the third data packet to the destination ASN, then turn to step 309.

In step 308, the source ASN takes the first data packet as the payload data packet of the forth data packet, and takes the RIDs of the source ASN and the destination ASN respectively as the source address and the destination address of the fourth data packet, which is encapsulated using GRE and is sent to the destination ASN by the generalized forwarding plane.

In step 309, the destination ASN decapsulates the first data packet from the received data packet, and sends the first data packet to the destination terminal by the access network.

The present invention also provides a system for transmitting data, which is applied in an identification identifier locator separation network, the system comprises: a source terminal, a source ASN, a mapping forwarding plane and a destination ASN, wherein:

the source terminal is configured to send a first data packet to a source Access Support Node (ASN), and take an Access Identity (AID) of the source terminal and the AID of a destination terminal as a source address and a destination address of the first data packet respectively the source ASN is configured to: after receiving the first data packet, if a Routing Identifier (RID) corresponding to the AID of the destination terminal is not queried out locally, encapsulate the first data packet which is as a payload data packet to a second data packet by using Generic Routing Encapsulation (GRE) format, adding a GRE packet header and a delivery protocol packet header, and taking the RIDs of the source ANS and the access ILR respectively as the source address and the destination address of the delivery protocol packet header of the second data packet; and sending the second data packet to an access ILR of a mapping forwarding plane;

the source ASN is also configured to: after receiving the first data packet, if the RID corresponding to the AID of the destination terminal is queried out locally, encapsulate a fourth data packet using GRE encapsulation by taking the first data packet as payload data packet, adding a GRE packet header and a delivery protocol packet header and taking the RIDs of the source ASN and the destination ASN as the source address and the destination address of the delivery protocol packet header, and send the fourth data packet to the destination ASN.

The mapping forwarding plane is configured to query the RID corresponding to the AID of the destination terminal, and send the first data packet to the destination ASN according to the queried RID.

The process of the mapping forwarding plane querying the RID corresponding to the AID of the destination terminal comprises:

the access ILR decapsulates the received second data packet, and queries a responsible ILR which stores the mapping information of the AID of the destination terminal according to the AID of the destination terminal;

the access ILR encapsulates a query data packet using GRE format, and sends the query data packet to the responsible ILR, wherein the RIDs of the access ILR and the responsible ILR are as the source address and the destination address of the delivery protocol packet header of the query data packet respectively, and the first data packet is carried;

the responsible ILR decapsulates the received query data packet, and queries the RID corresponding to the AID of the destination terminal.

The process of the mapping forwarding plane sending the first data packet to the destination ASN according to the queried RID comprises: after querying the corresponding RID according to the AID of the destination terminal, the responsible ILR encapsulating a third data packet using GRE format, wherein the RIDs of the responsible ILR and the destination ASN are used as the source address and the destination address respectively in the delivery protocol packet header of the third data packet, and the first data packet is carried, and sending the third data packet to the destination ASN. The responsible ILR is also configured to: after querying the corresponding RID according to the AID of the destination terminal, encapsulate an answer data packet using GRE format by encapsulating the queried mapping information of the AID of the destination terminal and the RID to a payload data packet, and taking the RIDs of the responsible ILR and the source ASN as the source address and the destination address of the delivery protocol packet header respectively, and send the answer data packet to the source ASN;

the source ASN decapsulates the received answer data packet, and stores the mapping information of the AID of the destination terminal and the RID. The destination ASN is configured to: after receiving the third data packet, decapsulate out the first data packet, and send the first data packet to the destination terminal by an access network.

Other functions of the network elements in the system refer to the description of content of method.

The above descriptions are only preferred embodiments of the present invention, but not used to limit to the present invention, for those skilled in the art, there may be various improvements and variations of the present invention. Any changes, equivalent alternatives and improvements and the like made within the spirit and principle of the present invention should be included in the scope of the protection of the present invention.

Those skilled in the art should appreciate that the whole or part of the steps of above methods may be implemented by programmers instructing relevant hardware, the programs may be stored in a computer readable medium such as a read only memory, a disk or a compact disk, and so on. Alternatively, the whole or part of steps of the above embodiments may also be implemented using one or more integrated circuits. Correspondingly, each module/unit in the above embodiments may be implemented in form of hardware, or may be implemented in form of software function module. The present invention is not limited to any certain combination of hardware and software.

INDUSTRIAL APPLICABILITY

According to the present invention, data of a terminal is re-encapsulated using a GRE (Generic Routing Encapsulation) format, wherein, the GRE is widely supported in the existing IP network due to its generic encapsulation format, therefore by using the GRE format, modifications of present network devices may be reduced, the encapsulated data packet may be routed in the IP backbone network normally, and routers in the backbone network need no modification; the GRE has not limit on encapsulations of inner layer and outer layer, so the coding protocol of various user identifiers and locators may be supported flexibly; the GRE protocol regulates a variety of extension, and the problems such as security, checking and order preserving may be solved better by supporting protocol extension; also, the present invention realizes a high data forwarding performance, a network processor may be used to process, the encapsulation format is easy to extend, and the edition is convenient to upgrade.

What is claimed is:

1. A method for transmitting data, applied in an identification identifier locator separation network, the method comprising:

a source terminal sending a first data packet to a source Access Support Node (ASN), and taking an Access Identity (AID) of the source terminal and the AID of a destination terminal as a source address and a destination address of the first data packet respectively;

the source ASN, after receiving the first data packet, if a Routing Identifier (RID) corresponding to the AID of the destination terminal is not found locally, encapsulating the first data packet which is as a payload data packet to a second data packet by using Generic Routing Encapsulation (GRE) format, and adding a GRE packet header and a delivery protocol packet header; and the source ASN taking the RIDs of the source ASN and an access identity location register (ILR) of a mapping forwarding plane as a source address and a destination address of the delivery protocol packet header of the second data packet respectively, and sending the second data packet to the access ILR;

the access ILR decapsulating the received second data packet, and finding a responsible ILR which stores the mapping information of the AID of the destination terminal according to the AID of the destination terminal;

the access ILR encapsulating a query data packet using GRE format, and sends the query data packet to the responsible ILR, wherein the RIDs of the access ILR and the responsible ILR are as the source address and the destination address of the delivery protocol packet header of the query data packet respectively, and the first data packet is carried; and the responsible ILR decapsulating the received query data packet, and finding the RID corresponding to the AID of the destination terminal.

2. The method according to claim 1, wherein, the step of the mapping forwarding plane sending the first data packet to the destination ASN according to the found RID comprises:

the responsible ILR, after querying the corresponding RID according to the AID of the destination terminal, encapsulating a third data packet using GRE format, wherein the RIDs of the responsible ILR and the destination ASN are used as the source address and the destination address respectively in the delivery protocol packet header of the third data packet, and the first data packet is carried, and sending the third data packet to the destination ASN.

3. The method according to claim 2, further comprising:

the destination ASN, after receiving the third data packet, decapsulating out the first data packet and sending the first data packet to the destination terminal by an access network.

4. The method according to claim 1, further comprising:

the responsible ILR, after finding the corresponding RID according to the AID of the destination terminal, encapsulating an answer data packet using GRE format by encapsulating the found mapping information of the AID of the destination terminal and the RID to a payload data packet, and taking the RIDs of the responsible ILR and the source ASN as the source address and the destination address of the delivery protocol packet header respectively, and sending the answer data packet to the source ASN; and the source ASN decapsulating the received answer data packet, and storing the mapping information of the AID of the destination terminal and the RID.

5. The method according to claim 1, further comprising:

the source ASN, after receiving the first data packet, if the RID corresponding to the AID of the destination terminal is found locally, encapsulating a fourth data packet using GRE encapsulation by taking the first data packet as a payload data packet, adding a GRE packet header and a delivery protocol packet header and taking the RIDs of the source ASN and the destination ASN as the source address and the destination address of the delivery protocol packet header, and sending the fourth data packet to the destination ASN.

6. A system for transmitting data, applied in an identification identifier locator separation network, the system comprising: a source terminal, a source Access Support Node (ASN), a mapping forwarding plane and a destination ASN, wherein:

the source terminal is configured to: send a first data packet to a source Access Support Node (ASN), and take an Access Identity (AID) of the source terminal and the AID of a destination terminal as a source address and a destination address of the first data packet respectively the source ASN is configured to: after receiving the first data packet, if a Routing Identifier (RID) corresponding to the AID of the destination terminal is not found locally, encapsulate the first data packet which is as a payload data packet to a second data packet by using Generic Routing Encapsulation (GRE) format, and adding a GRE packet header and a delivery protocol packet header; taking the RIDs of the source ASN and the access ILR as a source address and a destination address of the delivery protocol packet header of the second data packet respectively; and sending the second data packet to an access Identity Location Register (ILR) of a mapping forwarding plane;

the mapping forwarding plane further comprises a responsible ILR;

the access ILR is configured to: decapsulate the received second data packet, and find a responsible ILR which stores the mapping information of the AID of the destination terminal according to the AID of the destination terminal; encapsulate a query data packet using GRE format, and sends the query data packet to the responsible ILR, wherein the RIDs of the access ILR and the responsible ILR are as the source address and the destination address of the delivery protocol packet header of the query data packet respectively, and the first data packet is carried in the query data packet;

the responsible ILR is configured to: decapsualte the received query data packet, and find the RID corresponding to the AID of the destination terminal.

7. The system according to claim 6, wherein, the responsible ILR is also configured to: after finding the corresponding RID according to the AID of the destination terminal, encapsulate a third data packet using GRE format, wherein the RIDs of the responsible ILR and the destination ASN are used as the source address and the destination address respectively in the delivery protocol packet header of the third data packet, and the first data packet is carried in the third data packet, and send the third data packet to the destination ASN.

8. The system according to claim 7, wherein, the destination ASN is configured to: after receiving the third data packet, decapsulate out the first data packet, and send the first data packet to the destination terminal by an access network.

9. The system according to claim 6, wherein, the responsible ILR is also configured to: after finding the corresponding RID according to the AID of the destination terminal, encapsulate an answer data packet using GRE format by encapsulating the found mapping information of the AID of the destination terminal and the RID to a payload data packet, and taking the RIDs of the responsible ILR and the source ASN as the source address and the destination address of the delivery protocol packet header respectively, and send the answer data packet to the source ASN;

the source ASN is also configured to: decapsulate the received answer data packet, and storing the mapping information of the AID of the destination terminal and the RID.

10. The system according to claim 6, wherein, the source ASN is also configured to: after receiving the first data packet, if the RID corresponding to the AID of the destination terminal is found locally, encapsulate a fourth data packet using GRE encapsulation by taking the first data packet as a payload data packet, adding a GRE packet header and a delivery protocol packet header and taking the RIDs of the source ASN and the destination ASN as the source address and the destination address of the delivery protocol packet header, and send the fourth data packet to the destination ASN.

* * * * *